United States Patent
Krainikov et al.

(10) Patent No.: US 10,873,834 B2
(45) Date of Patent: Dec. 22, 2020

(54) RADIO MAPS FOR LOCATION AND/OR POSITIONING SERVICES

(71) Applicant: HERE GLOBAL B.V., Eindhoven (NL)

(72) Inventors: Stanislav Krainikov, Tampere (FI); Tatiana Vyunova, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/601,072

(22) Filed: Oct. 14, 2019

(65) Prior Publication Data

US 2020/0128360 A1 Apr. 23, 2020

(30) Foreign Application Priority Data

Oct. 23, 2018 (EP) ..................................... 18201982

(51) Int. Cl.
*H04W 4/029* (2018.01)
*H04W 4/70* (2018.01)
*G01S 19/05* (2010.01)
*G01S 5/02* (2010.01)
*H04W 64/00* (2009.01)

(52) U.S. Cl.
CPC ............. *H04W 4/029* (2018.02); *H04W 4/70* (2018.02)

(58) Field of Classification Search
CPC ....... H04W 4/029; H04W 4/70; H04W 64/00; G01S 19/05; G01S 5/0236; G01S 5/0205; G01S 5/0252
USPC .......................... 455/404.2, 414.2, 456.1-457
See application file for complete search history.

(56) References Cited

U.S. PATENT DOCUMENTS

| | | |
|---|---|---|
| 8,121,611 B2 | 2/2012 | Shim |
| 2007/0202887 A1 | 8/2007 | Counts et al. |
| 2008/0287140 A1* | 11/2008 | Lee ........................ H04W 64/00 455/456.2 |
| 2010/0156713 A1 | 6/2010 | Harper |
| 2015/0208329 A1 | 7/2015 | Wirola et al. |
| 2015/0215890 A1 | 7/2015 | Nagatomo |

(Continued)

OTHER PUBLICATIONS

Extended European Search Report for Application No. 18201982.8 dated Oct. 14, 2019, 15 pages.

(Continued)

*Primary Examiner* — Michael Y Mapa
(74) *Attorney, Agent, or Firm* — Alston & Bird LLP

(57) ABSTRACT

Inter-alia, a method is disclosed comprising: obtaining one or more first fallback objects indicative of a geographic area that is covered by one or more cells of a communication network; obtaining one or more pieces of cell information indicative of a number of positioning requests that a respective cell of the one or more cells has received; determining one or more second fallback objects out of the one or more fallback objects; determining for an area of the respective second fallback object in that the needed level of accuracy for determining a position is not achievable, one or more cells based at least partially on the one or more pieces of cell information; and outputting the determined one or more second fallback objects and/or the determined one or more cells for usage in a generation of a radio map. It is further disclosed an according apparatus, computer program and system.

16 Claims, 7 Drawing Sheets

(56) References Cited

U.S. PATENT DOCUMENTS

| | | | | |
|---|---|---|---|---|
| 2016/0142972 A1* | 5/2016 | Wirola | ............... | H04W 64/00 370/338 |
| 2016/0374046 A1* | 12/2016 | Wirola | ............... | H04W 64/00 |
| 2017/0086164 A1 | 3/2017 | Park et al. | | |
| 2017/0223506 A1 | 8/2017 | Kim et al. | | |
| 2017/0238205 A1 | 8/2017 | Syrjarinne et al. | | |
| 2018/0188348 A1 | 7/2018 | Wirola et al. | | |

OTHER PUBLICATIONS

Lin, Y-T. et al., *A Case Study of Indoor Positioning in an Unmodified Factory Environment*, 2014 International Conference on Indoor Positioning and Indoor Navigation (Oct. 2014) 721-722.

* cited by examiner

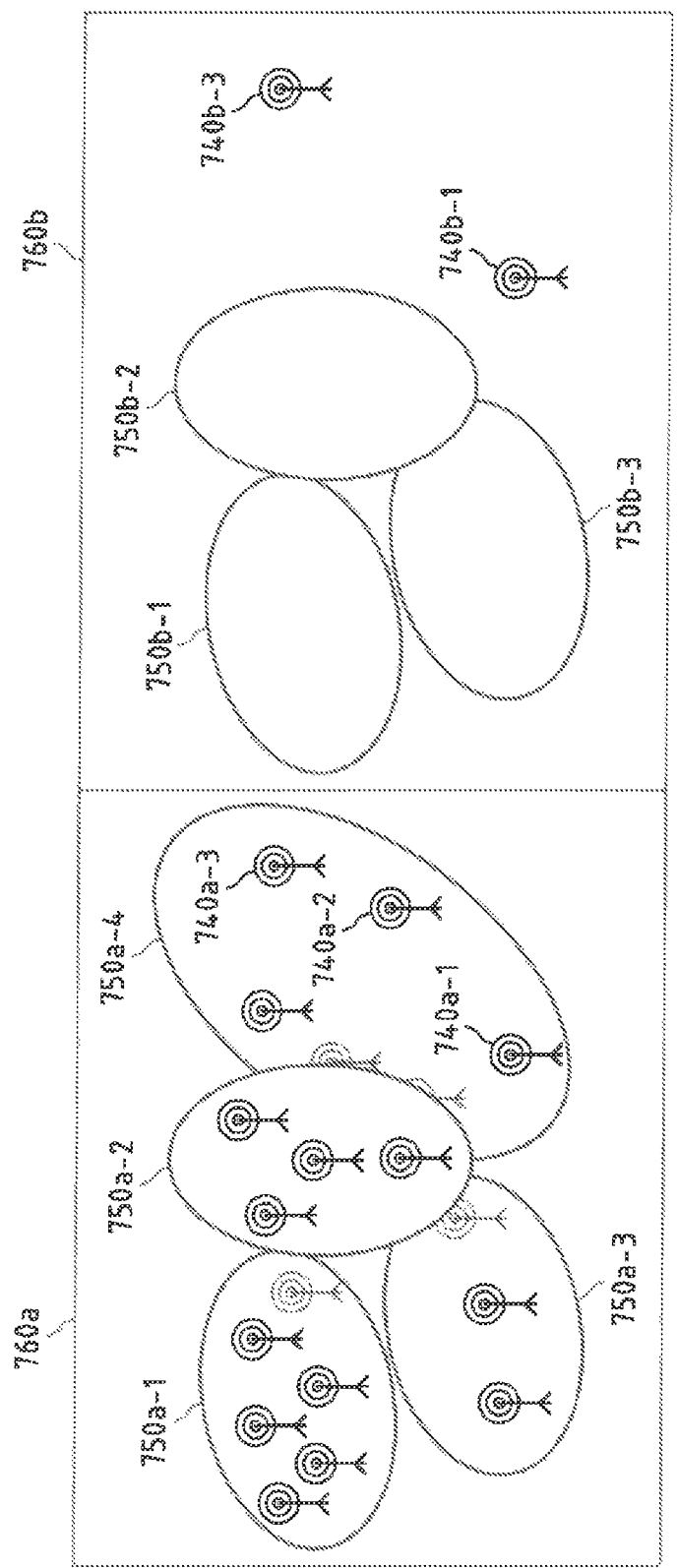

RADIO MAPS FOR LOCATION AND/OR POSITIONING SERVICES

CROSS-REFERENCE TO RELATED APPLICATIONS

This application claims priority to European Patent Application No. 18201982.8, filed Oct. 23, 2018, the entire contents of which are incorporated herein by reference.

FIELD

The following disclosure relates to the field of positioning, or more particularly relates to systems, apparatuses, and methods for using radio maps to provide e.g. one or more reference locations.

BACKGROUND

IoT (Internet-of-Things), IoT-wearable devices (e.g. kids watches, sport activity watches, to name but a few non-limiting examples), and/or asset trackers nowadays often have GNSS (Global Navigation Satellite System) devices respectively capabilities but are limited in storage and often do not allow connection to the internet or trying to limit it e.g. to save battery power.

Further, it is known to provide estimates of A-GNSS (Assisted GNSS) for e.g. 14 or more days based on previous A-GNSS data provided current location is known. Reference location can be received by making an online request or can be calculated locally using pre-loaded data. Precision of reference location does not need to be very precise i.e. accuracy of 20 to 30 km is sufficient.

Cell information (e.g. cell radio maps) is a further source of positioning information, but data files are taking a lot of space on devices. For example, only for Geran (GSM) cell information size may be over 10 MB, and for LTE it may be even over 40 MB, to name but a few non-limiting examples.

SUMMARY OF SOME EXEMPLARY EMBODIMENTS

If data is pre-installed on such devices, radio map covering larger (geographical) area(s) may need more disk space. Further, for downloaded radio maps, reducing data size improves download time and allows such devices to spend more time in low power mode. Also charges for transmitted data applying may be reduced.

Online requests could be made to get reference position, but in particular with IoT devices, transmitting of needed data may consume significant amount of energy stored in a battery and further shorten time between recharging battery.

It is thus, inter alia, the technical object to avoid such disadvantages and in particular reduce an amount of storage space needed (e.g. on electronic devices) for offline radio maps.

According to a first exemplary aspect of the present invention, a method is disclosed, the method comprising:
 obtaining one or more first fallback objects indicative of a geographic area that is covered by one or more cells of a communication network, wherein a respective first fallback object comprises at least one cell and/or an area information indicative of the geographic area the respective at least one cell belongs to;
 obtaining one or more pieces of cell information indicative of a number of positioning requests that a respective cell of the one or more cells has received;
 determining one or more second fallback objects out of the one or more fallback objects, wherein the one or more second fallback objects are determined based at least partially on whether or not a needed level of accuracy for determining a position is achievable based on the respective second fallback object;
 determining for an area of the respective second fallback object in that the needed level of accuracy for determining a position is not achievable, one or more cells based at least partially on the one or more pieces of cell information; and
 outputting the determined one or more second fallback objects and/or the determined one or more cells for usage in a generation of a radio map.

This method may for instance be performed and/or controlled by an apparatus, for instance a server and/or a base station of the communication network. Alternatively, this method may be performed and/or controlled by more than one apparatus, for instance a server cloud comprising at least two servers.

The method according to the first exemplary aspect of the present invention may for instance be used for determining (e.g. estimating) a position of an electronic device, e.g. based at least partially on A-GNSS services.

According to a further exemplary aspect of the present invention, a computer program is disclosed, the computer program when executed by a processor causing an apparatus, for instance a server and/or a base station, to perform and/or control the steps of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a second exemplary aspect of the present invention, a method is disclosed, the method comprising:

obtaining one or more radio maps, wherein at least a part of a respective radio map is or comprises at least one reference position indicative of a position in a geographic area, wherein the one or more radio maps further comprise at least one cell of a communication network; and determining the position information indicative of a position, wherein the position information is determined based at least partially on the one or more radio maps, and at least one cell of the communication network in which the apparatus is currently residing.

This method may for instance be performed and/or controlled by an apparatus, for instance an electronic device, e.g. a (mobile) terminal. For instance, the method may be performed and/or controlled by using at least one processor of the electronic device.

The method according to the first exemplary aspect of the present invention may for instance be used for determining (e.g. estimating) a position of the electronic device based at least partially on A-GNSS services.

According to a further exemplary aspect of the invention, a computer program is disclosed, the computer program when executed by a processor causing an apparatus, for instance the electronic device, to perform and/or control the steps of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect of the invention may be a module or a component for a device, for example a chip. The disclosed apparatus according to any aspect of the invention may comprise only the disclosed components, for instance means, processor, memory, or may further comprise one or more additional components.

According to a third exemplary aspect of the invention, a system is disclosed, comprising:

at least one first apparatus (e.g. server, server cloud, or a base station) according to any aspect of the invention as disclosed above, and at least one second apparatus (e.g. electronic device), wherein the at least one second apparatus is to be provided with one or more radio maps (e.g. from the at least one first apparatus), wherein the at least one second apparatus is further configured to determine (e.g. estimate) its position based, at least in part, on the provided one or more radio maps, and at least one cell of the communication network in which the at least one second apparatus is currently residing.

In the following, exemplary features and exemplary embodiments of all aspects of the present invention will be described in further detail.

The method according to the first exemplary aspect of the present invention may for instance be performed by a base station (e.g. a gNB (Next Generation NodeB)) of the communication network. The communication network may for instance be a wireless communication network, e.g. a cellular communication network according to e.g. LTE communication standard and/or NR (New Radio) communication technologies (also referred to as future radio technologies). Further, the communication network may for instance be according to GSM (Global System for Mobile Communications), and/or GPRS (General Packet Radio Service) communication standard. The gNB may for instance be comprised by or be a part of a CRAN (Centralized RAN (Radio Access Network)) architecture of the wireless communication network.

Such one or more base stations of the communication network may for instance enable the determining (e.g. estimating) of a position of an electronic device.

For instance, two types of positioning services may for instance be supported: i) so-called terminal-based type, wherein an electronic device may for instance receive data from the communication network, and then may for instance determine its location, and ii) so-called terminal-assisted type, wherein an electronic device may for instance receive data from the communication network, and further is configured to perform position related measurements (e.g. satellite pseudoranges, and/or fingerprints to name but one non-limiting example), and provide those measurements back to the communication network that then determines the position of the electronic device.

Further, determining of a position of an electronic device may for instance be based, at least partially, on SUPL (Secure User Plane Location). This can improve the performance of position respectively location estimates.

SUPL is an encrypted IP technology that was developed to support Location-Based Services (LBS) for wireless communications. SUPL may for instance enable the determining of a position of an electronic device: i) Network Initiated (NI), wherein the communication network may for instance determine the electronic device location, and ii) SET (SUPL Enabled Terminal) Initiated (SI), wherein the electronic device may for instance determine its location (itself). To be able to establish a NI determining of the position, a trigger may for instance be sent to the electronic device (e.g. a SET) enabling the device to get into a connected state and to contact a specific IP address and port. This may for instance correspond to the abovementioned terminal-assisted mode.

SI within the meaning of the present invention is understood as a SUPL request that is utilized according to example embodiments of the present invention. For instance, such SUPL requests may for instance be utilized by an electronic device that may for instance require its position for a particular service (e.g. navigation, applications, or location-based services, to name but a few non-limiting examples) to be determined. SI may for instance correspond to the abovementioned terminal-based mode.

So-called cell technology fallback objects (short: fallback objects) within the meaning of the present invention may for instance be area codes. Such area codes may for instance be indicative of an (geographic) area the respective cell(s) of the one or more cells belong to. Such one or more fallback objects may for instance contain area codes from one to hundreds of cells of the one or more cells, e.g. depending on cell density in the (geographic) area. For instance, in sport and trade centers there could be tens or even hundred base stations (e.g. representing a respective cell of the one or more cells) to cover network usage peaks during competitions, exhibitions e.g. with several thousands of visitors.

A respective fallback object of the one or more fallback objects may for instance comprise or represent at least one (area) identifier, e.g. an area code. Such an area code may for instance represent the (geographic) area that is covered by a respective cell of the one or more cells of the communication network. Further, a respective fallback object may comprise or be associated with a reference location that may for instance be utilized in determining a position, e.g. by an electronic device. Thus, a respective fallback object may for instance comprise or represent a plurality (e.g. at least two) of such identifiers, wherein each identifier of the plurality of identifiers may for instance be indicative of an (geographic area) the respective cell of the one or more cells (e.g. that is associated with the respective identifier) belongs to. Such a determined cell may for instance also be referred to as cell object.

The needed level of accuracy for determining a position may for instance represent an accuracy an electronic device can achieve when determining (e.g. estimating) its position based, at least partially, on the (determined) one or more second fallback objects and/or cells.

Further, one or more fallback objects out of the one or more obtained first fallback objects may for instance be rejected, e.g. in case a size of a respective second fallback object of the one or more fallback objects is too large, and/or is above the threshold value.

Then, the determined one or more second fallback objects and/or the determined one or more cells are output for usage in a generation of a radio map. Then, such a generated radio map may for instance be provided to one or more electronic devices that may for instance determine (e.g. estimate) their respective position based, at least partially, on the radio map.

This method enables to reduce the size of offline radio maps that may be used for determining an electronic device's position. Such an offline radio map may for instance comprise at least one reference position that can be used for determining the position of the electronic device (offline). In order to keep the size of such offline radio maps small, one or more second fallback objects can be combined with cells in places and/or areas where the second fallback object may for instance not provide the reference position that may be utilized for determining the position of an electronic device (e.g. the second apparatus performing and/or controlling the method according to the second exemplary aspect of the present invention).

A respective piece of cell information of the one or more pieces of cell information is indicative of an amount (respectively number) of positioning requests a respective cell of the one or more cells of the communication network has received, e.g. in the past. Such a positioning request may for instance be an abovementioned SUPL request, to name but one non-limiting example.

Further, there may for instance be one or more pieces of cell information that do not comprise or represent such information indicative of a respective amount (number) of positioning requests (e.g. SUPL requests) of one or more cells of the communication network. Such cells may not be comprised by a radio map to be generated according to the method of the first exemplary aspect of the present invention, since such cells may for instance be used very rarely for position determining.

The determined one or more cells—in contrast—may for instance comprise or be represented by a cell identifier enabling the respective cell of the one or more cells to be identified. Further, the determined one or more cells may for instance comprise or be represented by (at least one or a single) reference position that can be used for determining a position based at least partially on a radio map that is to be generated based at least partially on the determined one or more cells. Then, such a radio map may for instance be provided to be used for determining a position based at least partially on the provided radio map.

The one or more second fallback objects and/or the one or more pieces of cell information and/or the one or more cells may for instance be stored in a memory, e.g. a database that is comprised by or a part of the communication network, and/or the apparatus configured to perform and/or control the method according to the first exemplary aspect of the present invention.

The steps of determining of the one or more second fallback objects and/or of determining of the one or more cells may for instance be performed and/or controlled iteratively until all of the obtained one or more first fallback objects and/or all of the obtained one or more pieces of cell information are processed.

In an exemplary embodiment according to the first exemplary aspect of the present invention, the one or more second fallback objects are determined based, at least in part, on a comparison of the size of the respective second fallback object with a pre-determined or determined according to pre-defined rules threshold value.

A respective first and/or second fallback object of the one or more first and/or second fallback objects may for instance be associated with a certain sub-area within the geographic area, and dependent upon the size of the sub-area that is associated with the certain first and/or second fallback object, a certain level of accuracy is achievable.

For instance, the larger the size of the sub-area is that is associated with the respective fallback object, the lower is the level of accuracy that may be achievable by an electronic device located within this sub-area and determining (e.g. estimating) its (e.g. current) location.

Further, some second fallback objects of the one or more second fallback objects may for instance not be determined out of the one or more obtained first fallback objects, since they may for instance be within a respective cell. Then, it may for instance be better to determine the respective cell, e.g. to provide a reference position for usage in a generation of a radio map, since the respective cell may for instance cover (nearly) the same (geographic) area than the respective fallback object, but may for instance be (significantly) smaller in its size.

The size of the respective first and/or second fallback objects may for instance refer to the size of the geographical area that is associated with the respective first and/or second fallback object, e.g. as represented by its identifier (e.g. area code). The size of the respective first and/or second fallback object may for instance refer to the size that is needed for storing the respective first and/or second fallback object (also referred to as data size of the respective first and/or second fallback object), e.g. in the memory. For instance, a respective second fallback object may be determined if the size (e.g. of the geographical area and/or the data size of the respective second fallback object) is within a limit, e.g. set out by a threshold value, or alternatively, in case the respective fallback object exceeds the limit set out by the threshold value. Such a threshold value may for instance be indicative of a maximum size a respective second fallback object can have so that it is taken into account when generating a radio map based at least partially on the respective second fallback object.

In an exemplary embodiment according to all aspects of the present invention, the one or more pieces of cell information are further indicative of a usage of a certain cell of the one or more cells of the communication network.

The usage may for instance be a historical number of positioning requests. The usage may for instance be determined based, at least partially, on the one or more cell information. For instance, the one or more pieces of cell information may for instance be analyzed to derive from those one or more pieces of cell information the number of positioning requests that the respective cell has received (in the past, e.g. day, week, months, year, or longer, to name but a few non-limiting examples). For instance, the number of positioning requests may for instance be represented by a number of SUPL requests and/or requests by asset trackers that have occurred in the respective cell of the one or more cells in the past.

In an exemplary embodiment according to the first exemplary aspect of the present invention, the method further comprises:
determining one or more cells to replace at least one of the one or more fallback objects in case the size of the at least one second fallback object is above the threshold value.

For instance, the one or more cells to replace at least one of the one or more second fallback objects are determined in case the respective cell is likely smaller in its size with respect to the size needed for storing a radio map that is to be generated based at least partially on the output one or more second fallback objects and/or the one or more cells.

In an exemplary embodiment according to all aspects of the present invention, the method further comprises:
generating a radio map based, at least in part, on the one or more second fallback objects and/or the one or more cells enabling a position to be determined based at least partially on the generated radio map.

The radio map may for instance be a partial radio map or a global radio map that can be provided e.g. to an electronic device requesting positioning services, e.g. by a corresponding positioning request. A partial radio map may for instance comprise only a part of an area that is comprised by the global radio map.

The radio map may for instance be a coverage area model of the radio positioning support system that may be provided, e.g. to at least one electronic device that requests its position respectively location to be determined. The radio map may for instance represent (e.g. fixed) installation positions of (the) one or more base stations, e.g. represented by one or more corresponding reference position, e.g. in the form of coordinates (e.g. x-, y-coordinates, and/or latitude-, longitude-coordinates, to name but a few non-limiting examples). Further, the radio map may for instance represent (e.g. expected) coverage areas associated with the respective base stations. The radio map may for instance represent a radio coverage model of the expected radio coverage associated with the respective base station. The electronic device may for instance determine (e.g. estimate) its (e.g. current) location based at least partially on the radio map.

The radio map is generated based, at least in part, on one or more determined second fallback objects and/or the one or more determined cells so that the generated radio map comprises a combination of second fallback objects with cells comprising e.g. cell information in the geographic area. The geographic area may for instance be a sub-area and/or one or more places that are located within the geographic area.

In this way, it is enabled to achieve on one or more electronic devices that are provided with the generated radio map good availability of reference position while keeping the size of the radio map that is provided to the one or more electronic device small (in particular minimal).

In an exemplary embodiment according to all aspects of the present invention, at least one reference position that can be used by an electronic device to determine its current location is comprised by or a part of the respective first and/or second fallback object.

For instance, the radio map may for instance comprise or represent at least one (or a plurality of) such reference positions after it is generated.

The radio map may thus have an optimized (e.g. reduced number of fallback objects and/or cells in comparison to the number of obtained first fallback objects and/or cells, e.g. represented by the obtained pieces of cell information). Further, the radio map may for instance provide such at least one reference positions that are located respectively positioned at at least one certain location within the geographic area that is covered by the radio map so that a respective electronic device, e.g. the apparatus configured to perform and/or control the method according to the second exemplary aspect of the present invention can estimate its position within the geographic area based at least partially on the radio map. Before the respective electronic device may for instance determine its position based at least partially on the radio map, the radio map may be provided (e.g. output) to the respective electronic device. Then, the respective electronic device may for instance store the radio map in a memory of the electronic device so that it can be obtained to be used for determining a position.

In an exemplary embodiment according to the first exemplary aspect of the present invention, the generated radio map is providable to one or more electronic devices for usage in a positioning service.

For instance, the generated radio map is providable to one or more electronic devices by outputting (e.g. transmitting) the generated radio map, e.g. from the apparatus that is configured to perform and/or control the method according to the first exemplary aspect of the present invention to one or more electronic devices, e.g. one or more apparatuses that are configured to perform and/or control the method according to the second exemplary aspect of the present invention.

For instance, based on such a providable radio map, a respective electronic device may for instance determine (e.g. estimate) its position.

In an exemplary embodiment according to the first exemplary aspect of the present invention, the method further comprises:

determining one or more parameters based, at least in part, on the determined or output one or more second fallback objects and/or the determined or output one or more cells, wherein the one or more parameters are indicative of a performance level indicator representing an achievable positioning accuracy.

Further, the method according to the first exemplary aspect of the present invention may for instance utilize a frequency of how often the one or more cells of the communication network are used. This may for instance be not uniform: some cells of the one or more cells may for instance be used e.g. for reference position calculation very often (e.g. cells covering shopping malls, route hubs, etc.), and some other cells of the one or more cells may for instance be very rarely used (e.g. cells covering (an) geographic area located in the mountains, or in forest areas, to name but a few non-limiting examples).

Then, e.g. based on statistics how often cells are used in e.g. SUPL requests and/or cells are requested (e.g. by asset trackers), it is enabled e.g. to build a list of most used cells (locally, regionally, and/or globally) and even seed cells using some criteria, for example, kids watch need fast fix mostly in cities but are rarely used in mountains.

Thus, for offline radio maps to meet quality criteria, it will be sufficient that fast fix would be achieved in, for example 95% of reference location attempts.

In an exemplary embodiment according to the first exemplary aspect of the present invention, the method further comprises:

verifying the one or more parameters based on a comparison with one or more pre-determined or determined according to pre-defined rules reference parameters; and repeating the step of determining of the one or more second fallback objects and/or pieces of cell information until the verifying leads to an acceptable result.

The one or more pre-determined or determined according to pre-defined rules reference parameters may for instance comprise or represent a threshold value. Such reference parameters may for instance set out one or more quality criteria that need to be achievable by one or more electronic devices that determine their respective position based, at least in part, on a radio map that is to be generated on the one or more second fallback objects and/or the one or more cells.

For instance, such a threshold value may be indicative of or represent a positioning accuracy, e.g. in a unit of length like yards or meters, that is achievable with a radio map generated based at least partially on the one or more fallback objects and/or the one or more cells.

Further, the reference parameters may for instance comprise or represent one or more TTFF (time to first fix) delay times. Such a TTFF delay times may for instance enable effective initial position determination (e.g. estimation) of a respective electronic device that is provided with a generated radio map according to exemplary embodiments of the present invention.

It will be understood that one or more determined (second) fallback objects and/or one or more determined cells that did not lead to a suffice result during the verifying may for instance not be used in a next repetition of the method according to the first exemplary aspect of the present invention. In order to achieve an enhanced (e.g. optimized) result, the method according to the first exemplary aspect of the present invention may for instance be repeated iteratively, e.g. several (more than one) times.

In an exemplary embodiment according to all aspects of the present invention, a respective second fallback object is associated with at least one reference position within the geographic area, wherein dependent upon the position of the reference position within the geographic area, a certain level of positioning accuracy is achievable.

In case the reference position is (e.g. almost) equidistant to e.g. borders of the geographic area, a level of positioning accuracy is achievable throughout this area. In contrast, in case the position of the reference position is e.g. close to a border of the geographic area, only determining of a position of an electronic device by one or more positioning requests performed within the vicinity of the reference position achieve a high-level of positioning accuracy, wherein e.g. a determining of a position, wherein the electronic device is located e.g. within the vicinity of a border opposite to the one of the reference position of the geographic area, may for instance lead to a poor positioning accuracy. Throughout the (entire) geographic area, compared to the first example, wherein in the latter example a lower positioning accuracy is achievable.

In an exemplary embodiment according to the first exemplary aspect of the present invention, the determining of the one or more fallback objects is further based on the certain level of accuracy.

For instance, by comparing the certain level of accuracy to a pre-determined or determined according to pre-defined rules threshold value, the one or more fallback objects are determined. In this way, a certain level of minimal accuracy can be guaranteed by the solution according to the present invention, since the needed level of accuracy for determining a position can be achieved, e.g. due to a verifying prior to providing the generated radio map to the one or more electronic devices.

The one or more radio maps may for instance be obtained by the second apparatus (e.g. a respective electronic device of the one or more electronic devices, e.g. as utilized by the method according to the second exemplary aspect of the present invention) configured to perform and/or control the method according to the second exemplary aspect of the present invention. The one or more radio maps may for instance be obtained from the first apparatus of the method according to the first exemplary aspect of the present invention The position of the second apparatus may for instance be determined (e.g. estimated) based at least partially on the one or more obtained radio maps. Such one or more radio maps may for instance be generated by the method according to the first exemplary aspect of the present invention, as disclosed above.

The at least one electronic device may for instance be a mobile device, e.g. a smartphone, tablet, wearable, IoT (Internet-of-Things)-device, and/or asset tracker to name but a few non-limiting examples. The electronic device may for instance be portable (e.g. weigh less than 5, 4, 3, 2, 1, or less than 1 kg). The electronic device may for instance comprise or be connectable to a display, e.g. for displaying information, e.g. a map or navigation information such as a route that is guide respectively navigated to a user. The electronic device may for instance comprise or be connectable to means for outputting sound, e.g. in form of spoken commands or information. The electronic device may for instance comprise or be connectable to one or more sensors for determining the devices position, such as for instance a GNSS receiver, e.g. in the form of a GPS receiver. The mobile device may for instance comprise or be connectable to a receiver and/or transmitter (e.g. a transceiver) for receiving and/or sending information, e.g. one or more radio maps. The electronic device may for instance be suitable for outdoor and/or indoor navigation respectively positioning.

In an exemplary embodiment according to the second exemplary aspect of the present invention, the radio map is received, e.g. from the apparatus according to the first exemplary aspect of the present invention.

In an exemplary embodiment according to the second exemplary aspect of the present invention, the method further comprises:
  sending a positioning request to at least one cell in case the one or more radio maps do not comprise at least one reference position that can be utilized for determining the position of the apparatus; and
  receiving a position information indicative of the position of the apparatus that is determined based on the sent positioning request.

The positioning request may for instance be sent to the at least one cell by sending the positioning request to a base station of the respective cell.

The at least one reference position may for instance be comprised by a respective fallback object and/or cell of a respective radio map of the obtained one or more radio maps.

In response to the sent positioning request, the position information is received, e.g. from the at least one cell respectively the base station of the respective cell.

In an exemplary embodiment according to the second exemplary aspect of the present invention, in case the one or more radio maps comprise at least one reference position, a position information indicative of the (apparatus') position is determined (e.g. estimated) based, at least in part, on the respective at least one reference position (e.g. comprised by a respective fallback object and/or cell of the radio map).

In an exemplary embodiment according to the second exemplary aspect of the present invention, a transceiver (of the apparatus) is turned on only in case the obtained one or more radio maps do not comprise at least one reference position, wherein the position information is determined further based, at least in part, on a cell information that is requested prior to the determining of the position information.

The transceiver (of the apparatus) is turned on only in case the obtained one or more radio maps do not comprise at least one reference position enabling the apparatus to determine (e.g. estimating) its position based at least partially on the one or more radio maps. In this case, the position may for instance be determined based on a positioning request that is sent to a cell of the communication network to that the apparatus may for instance establish a communication connection, e.g. to a respective base station of the cell.

This may for instance also be the case when the apparatus according to the second exemplary aspect of the present invention is located within the area of a radio map in that a reference position is not available but the apparatus is still located within the geographic area covered by the one or more radio maps.

In an exemplary embodiment according to the second exemplary aspect of the present invention, the (obtained) one or more radio maps are stored in a memory.

The memory may for instance be a database that is comprised by or a part of the apparatus configured to perform and/or control the method according to the second exemplary aspect of the present invention. Alternatively, this apparatus may for instance be connectable to such a database, e.g. via the communication network.

In an exemplary embodiment according to the second exemplary aspect of the present invention, the memory (e.g. database) comprises a plurality (e.g. at least two) of radio maps, wherein each of the plurality of radio maps respectively is a part of a global radio map.

As disclosed above, a respective radio map of the plurality of radio maps may for instance be a partial radio map, wherein the plurality of radio maps may for instance form global radio map. Such a partial radio map may for instance comprise only a part of an area that is comprised by the global radio map.

Those one or more radio maps may for instance be provided e.g. to the apparatus that is configured to perform and/or control the method according to the second exemplary aspect of the present invention (e.g. an electronic device), wherein this apparatus may for instance request at least one positioning service, e.g. by sending (e.g. transmitting) a corresponding positioning request.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

In the figures show:

FIG. 7a, b examples of radio maps generated before and after performing and/or controlling the method according to the first exemplary aspect of the present invention.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
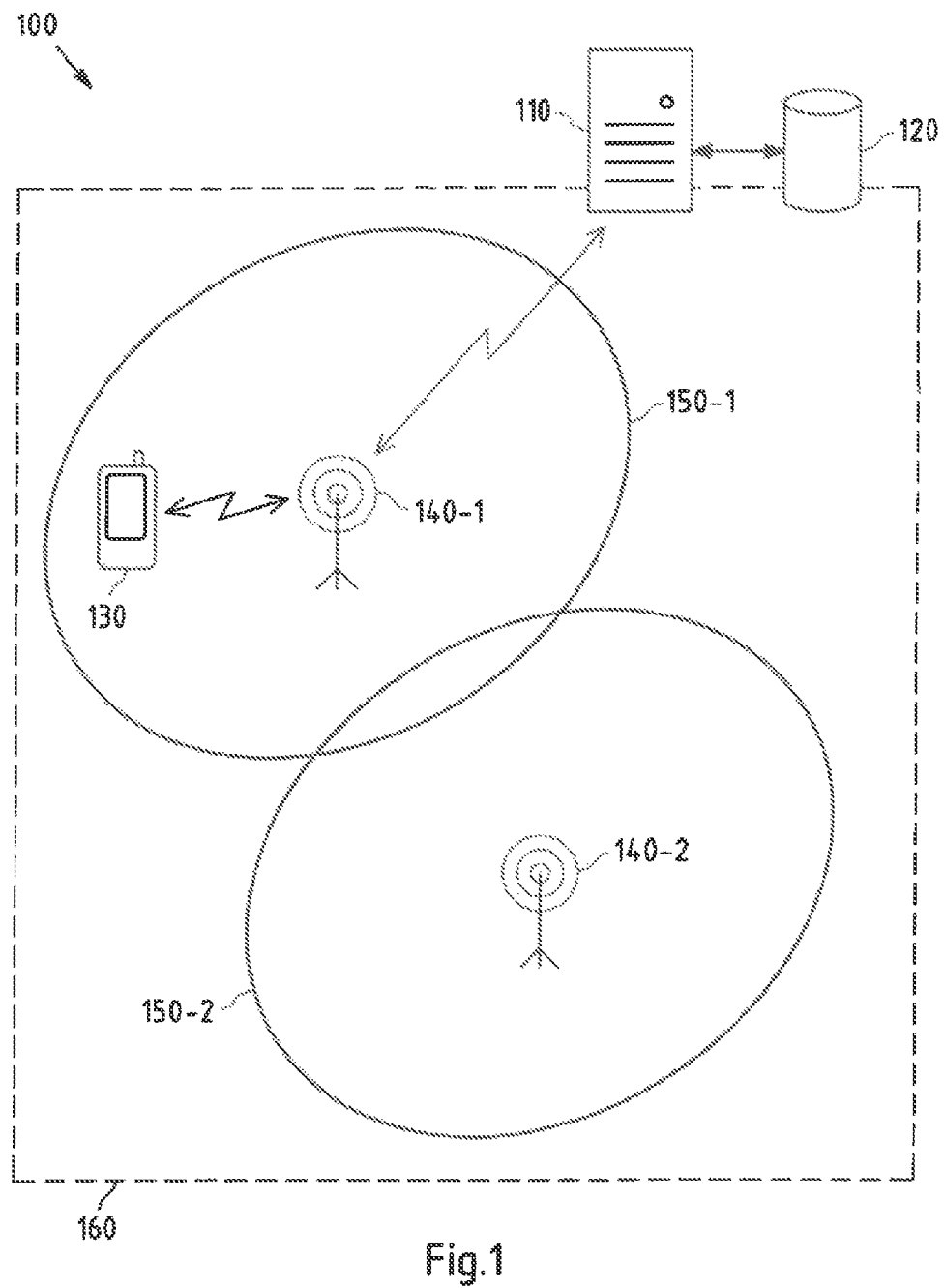
FIG. 1 a schematic block diagram of a system according to the third exemplary aspect of the present invention.

FIG. 1 is a schematic high-level block diagram of a system 100 according to an exemplary aspect of the present invention. Such a system 100 may for instance represent a positioning support system as used by one or more exemplary embodiments according to all exemplary aspects of the present invention. System 100 comprises a server 110, an optional database 120, and one or more electronic devices 130 (in FIG. 1 only a single one is shown). Further, system 100 comprises in a geographic area 160 base stations (e.g. gNBs) 140, wherein in FIG. 1 two of such base stations 140-1 and 140-2 are shown. Each of the base stations 140-1 and 140-2 has an associated coverage area 150, wherein base station 140-1 is associated with coverage area 150-1, and base station 140-2 is associated with coverage area 150-2. In case electronic device 130 is located within at least one of the coverage area 150-1, 150-2, communication services can be provided to the electronic device 130 via the respective base station 140-1, 140-2. Further, base stations 140-1, 140-2 can communicate with each other, and/or with server 110, e.g. via a communication network (e.g. cellular communication network established by the base stations 140-1, 140-2).

Server 110 may alternatively be embodied as a server cloud (e.g. a plurality of servers connected, e.g. via the Internet (not shown in FIG. 1) and providing services (e.g. positioning services) at least partially jointly). Server 110 may for instance be configured to provide radio maps, e.g. to one or more electronic devices 130 so that according to a so-called terminal-based mode the one or more electronic devices 130 are enabled to determine (e.g. estimate) their positions respectively locations, e.g. within the area 160, or alternatively, at least within the coverage areas 150-1, 150-2.

Database 120 is optional. Database 120 may for instance be comprised by or connectable to server 110. Database 120 may for instance comprise a memory, e.g. for storing one or more radio maps that may for instance be provided to the base stations 140-1, 140-2, and/or to the one or more electronic devices 130.

Example embodiments enable system 100 to perform and/or control the method according to the first and/or second exemplary aspect of the present invention.

Figure 2:
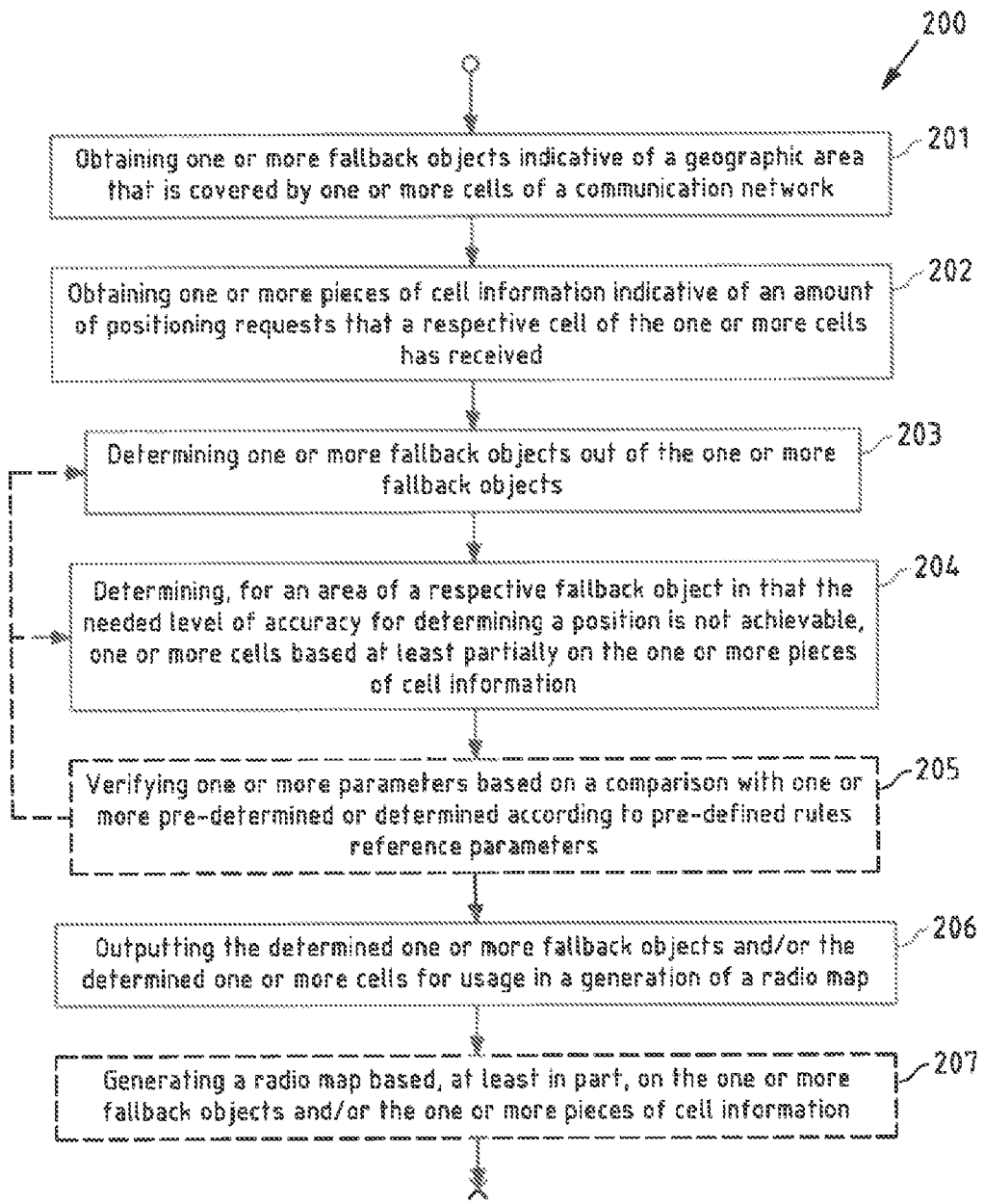
FIG. 2 a flowchart showing an example embodiment of a first method according to the first exemplary aspect of the present invention, for instance performed by a server 110 of FIG. 1.

FIG. 2 is a flowchart 200 showing an example embodiment of a method according to the first exemplary aspect of the present invention. This flowchart 200 may for instance be performed by server 110, or base stations 140-1, 140-2 of FIG. 1.

In a first step 201, one or more (first) fallback objects indicative of a geographic area that is covered by one or more cells of a communication network are obtained, e.g. from the database 120 storing such fallback objects. Additionally or alternatively, the one or more fallback objects are obtained (e.g. received) from the respective base station(s) (e.g. base stations 140-1, 140-2 of FIG. 1).

In a second step 202, one or more pieces of cell information indicative of a number of positioning requests that a respective cell of the one or more cells has received are obtained (e.g. requested), e.g. from the database 120 storing such pieces of cell information, or additionally or alternatively are obtained (e.g. received) from the respective base station(s) (e.g. base stations 140-1, 140-2 of FIG. 1).

In a third step 203, one or more (second) fallback objects out of the one or more (first) fallback objects are determined. The one or more (second) fallback objects are determined based at least partially on whether or not a needed level of accuracy for determining a position is achievable based on the respective fallback object in case it/they is/are comprised by a radio map used for such position determining. The determining may for instance be performed and/or controlled by the server 110 of FIG. 1, and/or at least one of the base stations 140-1, 140-2 of FIG. 1.

In a forth step 204, for an area of the respective (second) fallback object in that the needed level of accuracy for determining a position is not achievable, one or more cells based at least partially on the one or more pieces of cell information are determined. The determining may for instance be performed and/or controlled by the server 110 of FIG. 1, and/or at least one of the base stations 140-1, 140-2 of FIG. 1.

In an optional fifth step 205, one or more parameters based on a comparison with one or more pre-determined or determined according to pre-defined rules reference parameters are verified. The verifying may for instance be performed and/or controlled by the server 110 of FIG. 1, and/or at least one of the base stations 140-1, 140-2 of FIG. 1.

In a sixth step 206, the determined one or more (second) fallback objects and/or the determined one or more cells for usage in a generation of a radio map are output, e.g. to the server 110 of FIG. 1 that may for instance perform step 207 based at least partially on the output one or more (second) fallback objects and/or one or more cells. Additionally or alternatively, the one or more (second) fallback objects and/or one or more cells may for instance be output to an electronic device (e.g. electronic device 130 of FIG. 1) that may for instance generate a radio map (in accordance to step 207) based at least partially on the output one or more fallback objects and/or one or more cells.

In an optional seventh step 207, a radio map based, at least in part, on the one or more (second) fallback objects and/or the one or more pieces of cell information is generated. The generating of the radio map may for instance be performed and/or controlled by server 110 of FIG. 1 and/or by at least one of the base stations 140-1, 140-2 of FIG. 1.

Figure 3:
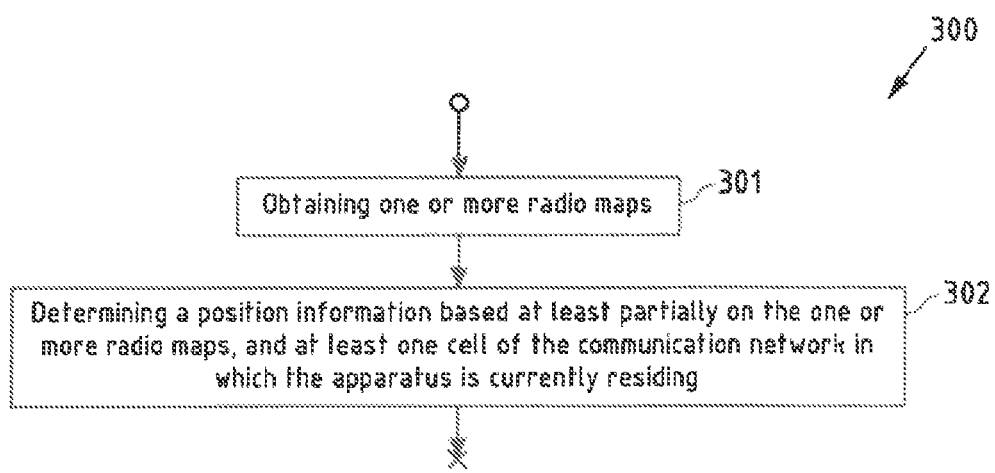
FIG. 3 a flowchart showing an example embodiment of a first method according to the first exemplary aspect of the present invention, for instance performed by an electronic device 130 of FIG. 1.

FIG. 3 is a flowchart 300 showing an example embodiment of a method according to the second exemplary aspect of the present invention. This flowchart 300 may for instance be performed by electronic device 130 of FIG. 1.

In particular, flowchart 200 may for instance be performed and/or controlled by at least one of the base stations 140-1, 140-2 of FIG. 1 and/or server 110 of FIG. 1 in conjunction with flowchart 300 that may for instance be performed by electronic device 130 of FIG. 1. Together, flowchart 200 of FIG. 2 and flowchart 300 of FIG. 3 may for instance enable a positioning support system (e.g. system 100 of FIG. 1) that enables a terminal-based mode for positioning services (e.g. determine position respectively location and/or navigation services).

In a first step 301, one or more radio maps are obtained, e.g. by receiving the one or more radio maps from at least one of the base stations 140-1, 140-2 of FIG. 1, and/or from the server 110 of FIG. 1. Additionally or alternatively, the one or more radio maps are obtained from a memory e.g. that is comprised or connectable to the electronic device 130 of FIG. 1, and that has stored the one or more radio maps in advance (prior to performing and/or controlling flowchart 300).

In a second step 302, a position is determined based at least partially on the one or more radio maps, and (e.g. a cell identifier indicative of) at least one cell of the communication network in which the electronic device 130 of FIG. 1 is currently residing is determined, e.g. by the electronic device 130 of FIG. 1.

Figure 4:
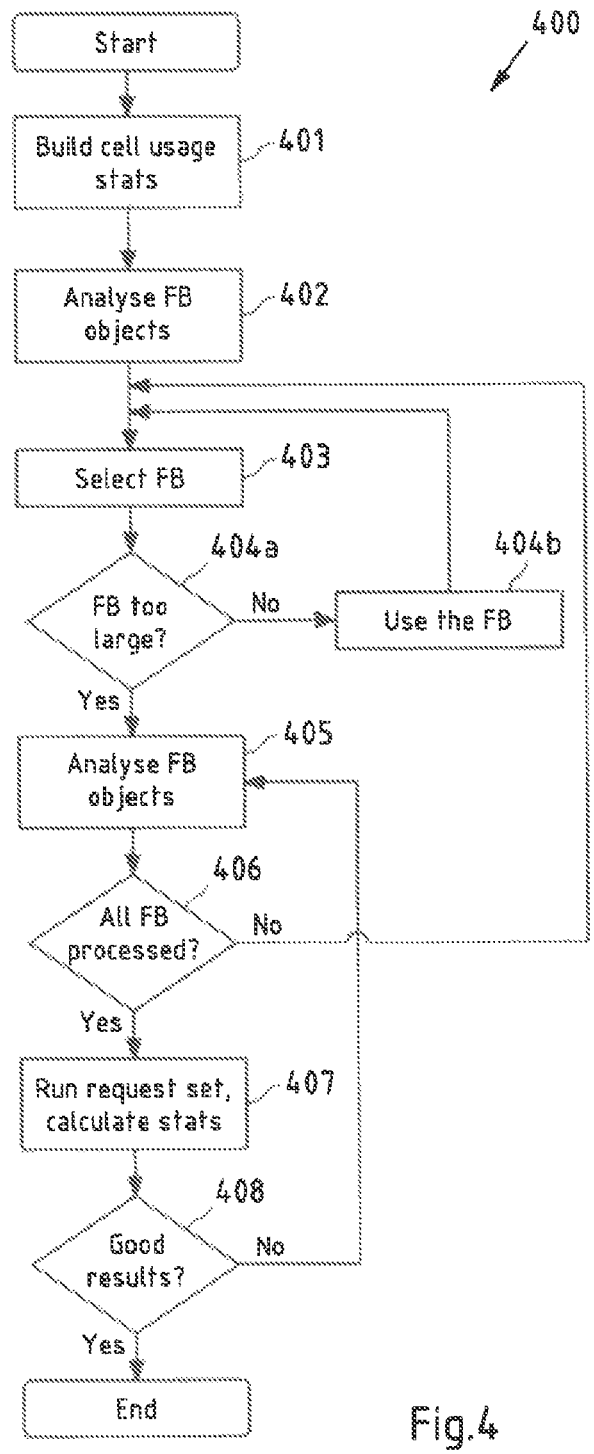
FIG. 4 an example of a flowchart showing an example embodiment of a system according to the third exemplary aspect of the present invention.

FIG. 4 is a flowchart 400 showing an example embodiment of a method according to the first and/or second exemplary aspect of the present invention. This flowchart 400 may for instance be performed by the system 100 of FIG. 1.

Flowchart 400 may for instance be used to improve positioning, e.g. based on existing solutions in both mobile and/or IoT segments. It may for instance be implemented in near coming future as current IoT devices are very storage space constrained and longer time between recharges is clearly one of the most important selling point in some segments.

Flowchart 400 performs and/or controls, among other things, a determining of fallback object(s) and cell(s).

In a first step 401, cell usage stats are build, wherein the cell usage stats may for instance be represented or comprised by one or more parameters. Such one or more parameters may for instance be determined based, at least in part, on one or more (obtained) cell information (see e.g. step 202 of FIG. 2), and/or on one or more (obtained) fallback (FB) objects (see e.g. step 201 of FIG. 2).

In a second step 402, fallback objects are analyzed (e.g. determined; see step 203 of FIG. 2).

In a third step 403, FB objects are selected (e.g. determined; see step 203 of FIG. 2 as well).

In a forth step 404a, it is checked whether or not the selected FB object (step 403) is too large. In case it is not too large, this FB object is determined to be output (see step 206 of FIG. 2; and step 404b). In case this FB object is too large, it is continued with step 405.

In a fifth step 405, cell(s) to replace the FB object of step 403 and 404a, 404b are selected to replace it, since e.g. the cell(s) may for instance be of smaller size resulting in a radio map of smaller size when the radio map is generated (see step 207 of FIG. 2).

In a sixth step 406, it is checked whether or not all FB objects are processed of the obtained FB objects (see step 401 and/or step 201 of FIG. 2). In case not all of the obtained FB objects are processed, it is continued with the next FB object, indicated in flowchart 400 with the arrow pointing back to step 403. In case that all of the obtained FB objects are processed, it is continued with step 407.

In a seventh step 407, request set is run, e.g. by electronic device 130 of FIG. 1, and stats are calculated (e.g. one or more parameters are verified based on a comparison with one or more pre-determined or determined according to pre-defined rules reference parameters).

In an eighth step 408, it is checked whether or not the results of the processing of step 407 have led to a good result (e.g. result of the comparison of step 407 is within a threshold value). In case the result is not good, (an)other cell(s) may for instance be searched in order to guarantee a good positioning accuracy, indicated in flowchart 400 with the arrow pointing back to step 405. In case the result is sufficient, e.g. a certain positioning accuracy can be guaranteed by a radio map that is to be generated (see step 207 of FIG. 2) based at least partially on the FB object(s) and/or the cell(s), the processing of the flowchart 400 may for instance be discontinued.

In this way, another source of position information is utilized by the present invention. Such sources of position information are e.g. cell technology fallback objects (FB objects), e.g. area codes the cells belong to. Such FB objects may for instance contain from one to hundreds of cells, depending on cell density. For instance, in sport and trade centers there could be tens or even hundred base stations (cell) to cover network usage peaks during competitions, exhibitions e.g. with several thousands of visitors.

Also frequency how often cells are used may for instance be not uniform: some cells are used for reference position calculation very often (e.g. shopping malls, route hubs, etc.) and some are very rarely used (e.g. mountain, forest areas).

Based on statistics how often cells are used in e.g. SUPL requests and/or is requested by asset trackers, which allows to build a list of most used cells globally and even seed cells using some criteria, for example, kids watch need fast fix mostly in cities but are rarely used in mountains.

For offline radio maps to meet quality criteria, it will be sufficient that fast fix would be achieved in, for example 95% of reference location attempts.

A method is presented to combine existing offline radio maps of different accuracy to reduce amount of space needed on device to get reference position needed for offline e.g. satellite orbits calculation. Combining fallback data with cellular data in places where fallback data does not provide needed reference position allows to achieve good availability on devices of reference position while keeping offline data sizes minimal.

The method according to the present invention may for instance be based on analysis of fallback objects and history of SUPL online requests. Example embodiments may work as follows:

Analyze fallback objects and remove those that are not providing sufficient level of accuracy (e.g. too large);

For areas that do not have fallback objects with needed level of accuracy but have high level of SUPL requests identify cells that are mostly used in requests and add them;

Verify that with selected fallback and cell objects at least 50, 60, 70, 80, 90%, or more of SUPL requests will provide sufficient reference position;

Produce offline radio maps based on selected fallback and cell objects and make them available for downloaded (e.g. by a radio map provisioning server). Clients may either have them pre-installed or download e.g. based on operating area conditions.

Verifying that with selected fallback and cell objects at least 50, 60, 70, 80, 90%, or more of SUPL requests will provide sufficient reference position may vary on how radio maps are used. For instance, for SUPL e.g. 68% of requests returning good position may be sufficient. It will be understood that there may be applications where higher level than the aforementioned is needed.

In this way, it is enabled to allow pre-loading of global offline radio maps on devices that do not have high specs. Comparing to online method, it allows significantly reduce time when device is powered on and communicating using cellular modem, causing high power consumption.

Even though having full cellular and/or Wi-Fi offline data or making online positioning requests might enable more accurate reference position, allowing wider spectrum of applications, in power consumption critical devices high accuracy is enabled but significantly reducing power consumption.

FIGS. 7a and 7b show respective sets of fallback objects and cells before (FIG. 7a) and after (FIG. 7b) optimizing or generating a radio map by performing and/or controlling the method according to the first and/or second exemplary aspect of the present invention.

It is shown in FIG. 7a that geographic area 760a comprises cells 750a-1 to 750a-4. Further, within the geographic area 760a, a plurality of base stations are located, wherein exemplary three different base stations 740a-1 to 740a-3 are marked in FIG. 7a. The position of the base stations 740a-1 to 740a-3 may for instance be known as a reference position that may for instance be utilized by an electronic device (e.g. electronic device 130 of FIG. 1) to determine (e.g. estimate) its (current) position respectively location. A corresponding radio map comprising all of the base stations and all of the cells 750a-1 to 750a-4 within the geographic area 760 is of relatively big size that needs to be transferred to the electronic device in case it is transmitted to the electronic device, and further, needs a relatively large amount of storage space on part of the electronic device storing the respective radio map.

In contrast, the radio map shown in FIG. 7b comprises less information resulting in a smaller size compared to the radio map shown in FIG. 7a. It can be seen in FIG. 7b that only two base stations 740b-2 (corresponding to base station 740a-2 shown in FIG. 7a) and base station 740b-3 (corresponding to base station 740a-3 shown in FIG. 7a) are comprised by the radio map shown in FIG. 7b. Furthermore, only three cells 750b-1, 750b-2, and 750b-3 of the four cells 750a-1 to 750a-4 shown in FIG. 7a are comprised by the radio map shown in FIG. 7b. The cells 750b-1, 750b-2, and 750b-3 and the base stations that may for instance be represented by corresponding fallback objects are determined according to the method of the first exemplary aspect of the present invention. This method enables to determine such cells and/or fallback objects to be comprised by a generated radio map that enable a good positioning accuracy for an electronic device (e.g. electronic device 130 of FIG. 1) since one or more reference positions associated with the respective one or more fallback objects and/or one or more cells are determined in a way enabling throughout the entire geographic area 760a of FIG. 7a respectively 760b of FIG. 7b that is covered by the radio maps shown in FIGS. 7a and 7b respective positions of one or more electronic devices (e.g. configured e.g. according to electronic device 130 of FIG. 1) can be determined (e.g. estimated) by the one or more electronic devices with a good accuracy.

Figure 5:
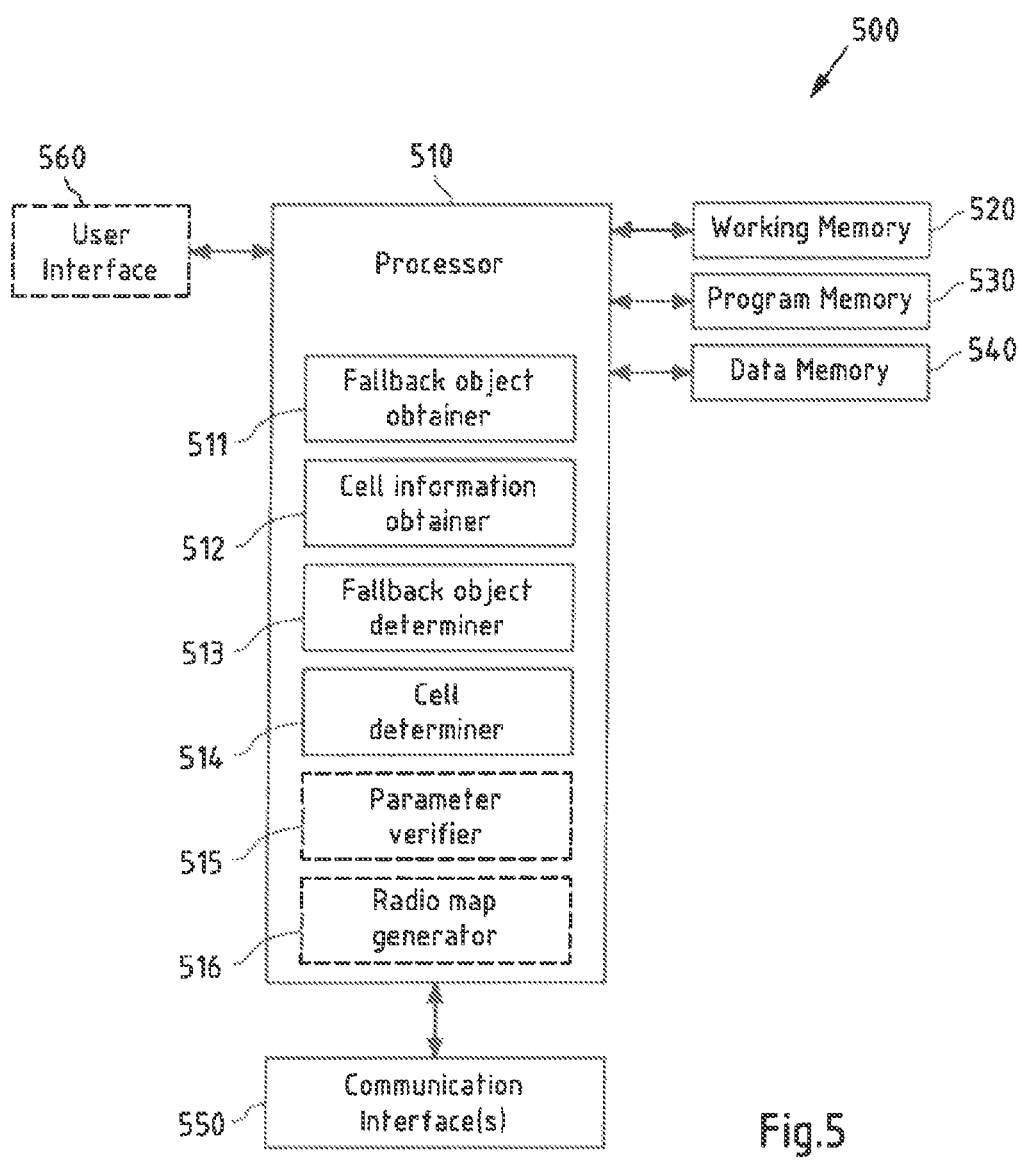
FIG. 5 a schematic block diagram of a first apparatus configured to perform the first method according to the first exemplary aspect of the present invention.

FIG. 5 is a schematic block diagram of an apparatus 500 according to an exemplary aspect of the present invention, which may for instance represent the server 110 of FIG. 1. Alternatively, the schematic block diagram of the apparatus 500 according to an exemplary aspect of the present invention may for instance represent base station 140-1 and/or 140-2.

Apparatus 500 comprises a processor 510, working memory 520, program memory 530, data memory 540, communication interface(s) 550, and an optional user interface 560.

Apparatus 500 may for instance be configured to perform and/or control or comprise respective means (at least one of 510 to 560) for performing and/or controlling the method according to the first exemplary aspect of the present invention. Apparatus 500 may as well constitute an apparatus comprising at least one processor (510) and at least one memory (520) including computer program code, the at least one memory and the computer program code configured to, with the at least one processor, cause an apparatus, e.g. apparatus 500 at least to perform and/or control the method according to first exemplary aspect of the invention of the present invention.

Processor 510 may for instance comprise a fallback object obtainer 511 as a functional and/or structural unit. Fallback object obtainer 511 may for instance be configured to obtain one or more fallback objects (see step 201 of FIG. 2).

Processor 510 may for instance comprise a cell information obtainer 512 as a functional and/or structural unit. Cell information obtainer 512 may for instance be configured to obtain one or more pieces of cell information (see step 202 of FIG. 2).

Processor 510 may for instance comprise a fallback object determiner 513 as a functional and/or structural unit. Fallback object determiner 513 may for instance be configured to determine one or more fallback objects (see step 203 of FIG. 2) out of obtained one or more fallback objects (see step 201 of FIG. 2).

Processor 510 may for instance comprise a cell determiner 514 a functional and/or structural unit. Cell determiner 514 may for instance be configured to determine one or more cells (see step 204 of FIG. 2).

Processor 510 may for instance comprise an optional parameter verifier 515 as a functional and/or structural unit. Parameter verifier 515 may for instance be configured to verify one or more parameters (see step 205 of FIG. 2).

Processor 510 may for instance comprise an optional radio map generator 516 as a functional and/or structural unit. Radio map generator 516 may for instance be configured to generate a radio map (see step 207 of FIG. 2).

Processor 510 may for instance further control the memories 520 to 540, the communication interface(s) 550, and the optional user interface 560.

Processor 510 may for instance execute computer program code stored in program memory 530, which may for instance represent a computer readable storage medium comprising program code that, when executed by processor 510, causes the processor 510 to perform the method according to the first exemplary aspect of the present invention.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Program memory 530 may also be included into processor 510. This memory may for instance be fixedly connected to processor 510, or be at least partially removable from processor 510, for instance in the form of a memory card or stick. Program memory 530 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 530 may also comprise an operating system for processor 510. Program memory 530 may also comprise a firmware for apparatus 500.

Apparatus 500 comprises a working memory 520, for instance in the form of a volatile memory. It may for instance be a Random Access Memory (RAM) or Dynamic RAM (DRAM), to give but a few non-limiting examples. It may for instance be used by processor 510 when executing an operating system and/or computer program.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 540 may for instance store one or more first fallback objects, one or more cell information, one or more second fallback objects that are determined based at least partially on obtained one or more fallback objects (see steps 201 and step 203 of FIG. 2), one or more cells that are determined (see step 204 of FIG. 2), one or more parameters, and/or one or more radio maps.

Communication interface(s) 550 enable apparatus 500 to communicate with other entities, e.g. with electronic device 130 of FIG. 1, with server 110 of FIG. 1 in case apparatus 500 represents base station 140-1, 140-2 of FIG. 1, and/or with base station 140-1, 140-2 of FIG. 1 in case apparatus 500 represents server 110 of FIG. 1. The communication interface(s) 550 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 500 to communicate with other entities, for instance shown in FIG. 1.

User interface 560 is optional and may comprise a display for displaying information to a user and/or an input device (e.g. a keyboard, keypad, touchpad, mouse, etc.) for receiving information from a user.

Some or all of the components of the apparatus 500 may for instance be connected via a bus. Some or all of the components of the apparatus 500 may for instance be combined into one or more modules.

Figure 6:
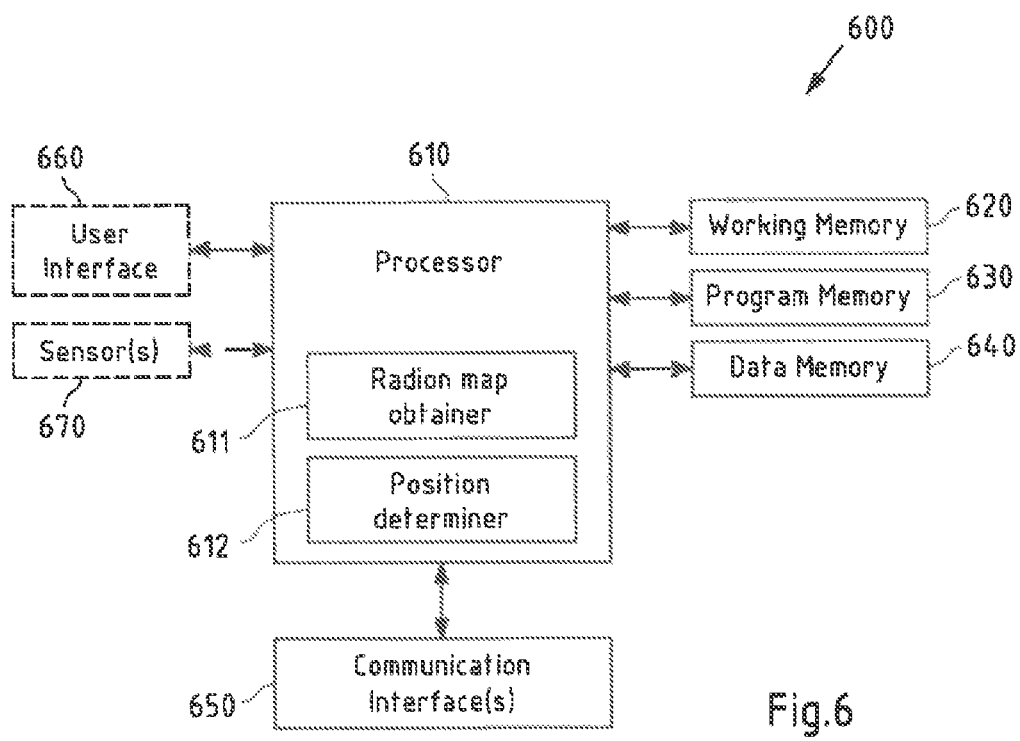
FIG. 6 a schematic block diagram of a second apparatus configured to perform the second method according to the second exemplary aspect of the present invention.

FIG. 6 is a schematic block diagram of an apparatus 600 according to an exemplary aspect of the present invention, which may for instance represent the electronic device 130 of FIG. 1.

Apparatus 600 comprises a processor 610, working memory 620, program memory 630, data memory 640, communication interface(s) 650, an optional user interface 660 and an optional sensor(s) 670.

Apparatus 600 may for instance be configured to perform and/or control or comprise respective means (at least one of 610 to 670) for performing and/or controlling the method according to the second exemplary aspect of the present invention. Apparatus 600 may as well constitute an apparatus comprising at least one processor (610) and at least one memory (620) including computer program code, the at least one memory and the computer program code configured to, with the at least one processor, cause an apparatus, e.g. apparatus 600 at least to perform and/or control the method according to second exemplary aspect of the invention of the present invention.

Processor 610 may for instance comprise a radio map obtainer 611 as a functional and/or structural unit. Radio map obtainer 611 may for instance be configured to obtain one or more radio maps (see step 301 of FIG. 3). Alternatively, one or more radio may for instance be obtained via the communication interface(s) 650, e.g. in case the one or more radio maps are received.

Processor 610 may for instance comprise position determiner 612 as a functional and/or structural unit. Position determiner 612 may for instance be configured to determine a position of the apparatus 600 based at least partially on one or more (obtained) radio maps (see step 302 of FIG. 3).

Processor 610 may for instance further control the memories 620 to 640, the communication interface(s) 650, the optional user interface 660 and the optional sensor(s) 670.

Processor 610 may for instance execute computer program code stored in program memory 630, which may for instance represent a computer readable storage medium comprising program code that, when executed by processor 610, causes the processor 610 to perform the method according to the second exemplary aspect of the present invention.

Processor 610 (and also any other processor mentioned in this specification) may be a processor of any suitable type. Processor 610 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 610 may for instance be an application processor that runs an operating system.

Program memory 630 may also be included into processor 610. This memory may for instance be fixedly connected to processor 610, or be at least partially removable from processor 610, for instance in the form of a memory card or stick. Program memory 630 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 630 may also comprise an operating system for processor 610. Program memory 630 may also comprise a firmware for apparatus 600.

Apparatus 600 comprises a working memory 620, for instance in the form of a volatile memory. It may for instance be a Random Access Memory (RAM) or Dynamic RAM (DRAM), to give but a few non-limiting examples. It may for instance be used by processor 610 when executing an operating system and/or computer program.

Data memory 640 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store one or more radio maps, and/or determined position information representing the position of the apparatus 600 that is determined, e.g. by position determiner 612.

Communication interface(s) 650 enable apparatus 600 to communicate with other entities, e.g. with server 110 of FIG. 1, and/or with base station 140-1, 140-2 of FIG. 1. The communication interface(s) 650 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 600 to communicate with other entities, e.g. entities shown in FIG. 1.

User interface 660 is optional and may comprise a display for displaying information to a user and/or an input device (e.g. a keyboard, keypad, touchpad, mouse, etc.) for receiving information from a user.

Sensor(s) 670 are optional and may for instance comprise a GNSS and/or GPS receiver.

Some or all of the components of the apparatus 600 may for instance be connected via a bus. Some or all of the components of the apparatus 600 may for instance be combined into one or more modules.

The following embodiments shall also be considered to be disclosed:

Embodiment 1

A first apparatus comprising at least one processor and at least one memory including computer program code, the at least one memory and the computer program code configured to, with the at least one processor, cause the apparatus to at least perform:
- obtaining one or more first fallback objects indicative of a geographic area that is covered by one or more cells of a communication network, wherein a respective first fallback object comprises at least one cell and/or an area information indicative of the geographic area the respective at least one cell belongs to;
- obtaining one or more pieces of cell information indicative of a number of positioning requests that a respective cell of the one or more cells has received;
- determining one or more second fallback objects out of the one or more fallback objects, wherein the one or more second fallback objects are determined based at least partially on whether or not a needed level of accuracy for determining a position is achievable based on the respective second fallback object;
- determining for an area of the respective second fallback object in that the needed level of accuracy for determining a position is not achievable, one or more cells based at least partially on the one or more pieces of cell information; and
- outputting the determined one or more second fallback objects and/or the determined one or more cells for usage in a generation of a radio map.

Embodiment 2

The apparatus according to embodiment 1, wherein the one or more second fallback objects are determined based, at least in part, on a comparison of the size of the respective second fallback object with a pre-determined or determined according to pre-defined rules threshold value.

Embodiment 3

The apparatus according to any of the preceding embodiments, wherein the one or more pieces of cell information are further indicative of a usage of a certain cell of the one or more cells of the communication network.

Embodiment 4

The apparatus according to embodiment 2, the at least one memory and the computer program code configured to, with the at least one processor, cause the apparatus further to perform:
- determining one or more cells to replace at least one of the one or more second fallback objects in case the size of the at least one second fallback object is above the threshold value.

Embodiment 5

The apparatus according to any of the preceding embodiments, the at least one memory and the computer program code configured to, with the at least one processor, cause the apparatus further to perform:
- generating a radio map based, at least in part, on the one or more second fallback objects and/or the one or more cells enabling a position to be determined based at least partially on the generated radio map.

Embodiment 6

The apparatus according to embodiment 5, wherein at least one reference position that can be used by an electronic device to determine its current location is comprised by or a part of the respective first and/or second fallback object.

Embodiment 7

The apparatus according to embodiment 5 or embodiment 6, wherein the generated radio map is providable to one or more electronic devices for usage in a positioning service.

Embodiment 8

The apparatus according to any of the preceding embodiments, the at least one memory and the computer program code configured to, with the at least one processor, cause the apparatus further to perform:
- determining one or more parameters based, at least in part, on the determined or output one or more second fallback objects and/or the determined or output one or more cells, wherein the one or more parameters are indicative of a performance level indicator representing an achievable positioning accuracy.

Embodiment 9

The apparatus according to embodiment 8, the at least one memory and the computer program code configured to, with the at least one processor, cause the apparatus further to perform:
- verifying the one or more parameters based on a comparison with one or more pre-determined or determined according to pre-defined rules reference parameters; and
- repeating the step of determining of the one or more second fallback objects and/or cells until the verifying leads to an acceptable result.

Embodiment 10

The apparatus according to any of the preceding embodiments, wherein a respective fallback object of the one or more fallback objects is associated with at least one reference position within the geographic area, wherein dependent upon the position of the reference position within the geographic area, a certain level of positioning accuracy is achievable.

Embodiment 11

The apparatus according to embodiment 10, wherein the determining of the one or more fallback objects is further based on the certain level of accuracy.

Embodiment 12

A second apparatus comprising at least one processor and at least one memory including computer program code, the at least one memory and the computer program code configured to, with the at least one processor, cause the apparatus to at least perform:

obtaining one or more radio maps, wherein at least a part of a respective radio map is or comprises at least one reference position indicative of a position in a geographic area, wherein the one or more radio maps further comprise at least one cell of a communication network; and determining a position indicative of a position, wherein the position information is determined based at least partially on the one or more radio maps, and a cell identifier indicative of at least one cell of the communication network in which the apparatus is currently residing.

Embodiment 13

The apparatus according to embodiment 12, wherein the radio map is received.

Embodiment 14

The apparatus according to embodiment 12 or 13, the at least one memory and the computer program code configured to, with the at least one processor, cause the apparatus further to perform:

sending a positioning request to at least one cell in case the one or more radio maps do not comprise at least one reference position that can be utilized for determining the position of the apparatus; and receiving a position information indicative of the position that is determined based on the sent positioning request.

Embodiment 15

The apparatus according to any of the embodiments 12 to 14, wherein in case the one or more radio maps comprise at least one reference position, a position information indicative of the position is determined based, at least in part, on the respective at least one reference position.

Embodiment 16

The apparatus according to any of the embodiments 12 to 15, wherein a transceiver is turned on only in case the one or more radio maps do not comprise at least one reference position, wherein the position information is determined further based, at least in part, on a cell information that is requested prior to the determining of the position information.

Embodiment 17

The apparatus according to any of the embodiments 12 to 16, wherein the one or more radio maps are stored in a memory.

Embodiment 18

The apparatus according to embodiment 17, wherein the memory comprises a plurality of radio maps, wherein each of the plurality of radio maps respectively is a part of a global radio map.

Embodiment 19

A first computer program code, said computer program code when executed by a processor causing an apparatus to perform the steps respectively actions according to any of the embodiments 1 to 11.

Embodiment 20

A second computer program code, said computer program code when executed by a processor causing an apparatus to perform the steps respectively actions according to any of the embodiments 12 to 18.

Embodiment 21

A first non-transitory computer readable storage medium in which computer program code is stored, the computer program code when executed by a processor causing an apparatus to perform the steps respectively actions according to any of the embodiments 1 to 11.

Embodiment 22

A second non-transitory computer readable storage medium in which computer program code is stored, the computer program code when executed by a processor causing an apparatus to perform the steps respectively actions according to any of the embodiments 12 to 18.

Embodiment 23

A first apparatus, said apparatus comprising means for performing the steps respectively actions according to any of the embodiments 1 to 11.

Embodiment 24

A second apparatus, said apparatus comprising means for performing the steps respectively actions according to any of the embodiments 12 to 18.

Embodiment 25

A system, comprising
at least one first apparatus configured according to any of the embodiments 1 to 11; and
at least one second apparatus configured according to any of the embodiments 12 to 18.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. A method, comprising:
   obtaining one or more first fallback objects indicative of a geographic area that is covered by one or more cells of a communication network, wherein a respective first fallback object comprises at least one cell and/or an area information indicative of the geographic area the respective at least one cell belongs to;
   obtaining one or more pieces of cell information of a number of positioning requests that a respective cell of the one or more cells has received;
   determining one or more second fallback objects out of the one or more first fallback objects, wherein the one or more second fallback objects are determined based at least partially on whether or not a needed level of accuracy for determining a position is achievable based on the respective second fallback object;
   determining for an area of the respective second fallback object in that the needed level of accuracy for determining a position is not achievable, one or more cells based at least partially on the one or more pieces of cell information; and
   outputting the determined one or more second fallback objects and/or the determined one or more cells for usage in a generation of a radio map.

2. The method according to claim 1, wherein the one or more second fallback objects are determined based, at least in part, on a comparison of the size of the respective second fallback object with a pre-determined or determined according to pre-defined rules threshold value.

3. The method according to claim 1, wherein the one or more pieces of cell information are further indicative of a usage of a certain cell of the one or more cells of the communication network.

4. The method according to claim 2, further comprising:
   determining one or more cells to replace at least one of the one or more second fallback objects in case the size of the at least one second fallback object is above the threshold value.

5. The method according to claim 1 further comprising:
   generating a radio map based, at least in part, on the one or more second fallback objects and/or the one or more cells enabling a position to be determined based at least partially on the generated radio map.

6. The method according to claim 5, wherein at least one reference position that can be used by an electronic device to determine its current location is comprised by or a part of the respective first and/or second fallback object.

7. The method according to claim 1, further comprising:
   determining one or more parameters based, at least in part, on the determined or output one or more second fallback objects and/or the determined or output one or more cells, wherein the one or more parameters are indicative of a performance level indicator representing an achievable positioning accuracy.

8. The method according to claim 7, further comprising:
   verifying the one or more parameters based on a comparison with one or more pre-determined or determined according to pre-defined rules reference parameters; and
   repeating the step of determining of the one or more second fallback objects and/or cells until the verifying leads to an acceptable result.

9. The method according to claim 1, wherein a respective fallback object of the one or more first fallback objects is associated with at least one reference position within the geographic area, wherein dependent upon the position of the reference position within the geographic area, a certain level of positioning accuracy is achievable.

10. The method according to claim 9, wherein the determining of the one or more second fallback objects is further based on the certain level of accuracy.

11. An apparatus comprising at least one processor and at least one memory including computer program code, the at least one memory and the computer program code configured to, with the at least one processor, cause the apparatus at least to:
   obtain one or more first fallback objects indicative of a geographic area that is covered by one or more cells of a communication network, wherein a respective first fallback object comprises at least one cell and/or an area information indicative of the geographic area the respective at least one cell belongs to;
   obtain one or more pieces of cell information indicative of a number of positioning requests that a respective cell of the one or more cells has received;
   determine one or more second fallback objects out of the one or more first fallback objects, wherein the one or more second fallback objects are determined based at least partially on whether or not a needed level of accuracy for determining a position is achievable based on the respective second fallback object;

determine for an area of the respective second fallback object in that the needed level of accuracy for determining a position is not achievable, one or more cells based at least partially on the one or more pieces of cell information; and output the determined one or more second fallback objects and/or the determined one or more cells for usage in a generation of a radio map.

12. The apparatus according to claim 11, wherein the one or more second fallback objects are determined based, at least in part, on a comparison of the size of the respective second fallback object with a pre-determined or determined according to pre-defined rules threshold value.

13. The apparatus according to claim 12, wherein the at least one memory and the computer program code are further configured to, with the at least one processor, cause the apparatus to determine one or more cells to replace at least one of the one or more second fallback objects in case the size of the at least one second fallback object is above the threshold value.

14. The apparatus according to claim 11, wherein the one or more pieces of cell information are further indicative of a usage of a certain cell of the one or more cells of the communication network.

15. The apparatus according to claim 11, wherein the at least one memory and the computer program code are further configured to, with the at least one processor, cause the apparatus to generate a radio map based, at least in part, on the one or more second fallback objects and/or the one or more cells enabling a position to be determined based at least partially on the generated radio map.

16. The apparatus according to claim 11, wherein the at least one memory and the computer program code are further configured to, with the at least one processor, cause the apparatus to determine one or more parameters based, at least in part, on the determined or output one or more second fallback objects and/or the determined or output one or more cells, and wherein the one or more parameters are indicative of a performance level indicator representing an achievable positioning accuracy.

* * * * *

UNITED STATES PATENT AND TRADEMARK OFFICE
CERTIFICATE OF CORRECTION

PATENT NO. : 10,873,834 B2
APPLICATION NO. : 16/601072
DATED : December 22, 2020
INVENTOR(S) : Krainikov et al.

It is certified that error appears in the above-identified patent and that said Letters Patent is hereby corrected as shown below:

In the Claims

Column 25 Line 54:
"obtaining one or more pieces of cell information of a"
Should read:
--obtaining one or more pieces of cell information indicative of a--

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*